(12) United States Patent
Fetterman (10) Patent No.: US 10,408,931 B2
(45) Date of Patent: Sep. 10, 2019

(54) RADAR MODULE

(71) Applicant: Veoneer US, Inc., Southfield, MI (US)

(72) Inventor: Matthew Fetterman, Waltham, MA (US)

(73) Assignee: Veoneer US, Inc., Southfield, MI (US)

( * ) Notice: Subject to any disclaimer, the term of this patent is extended or adjusted under 35 U.S.C. 154(b) by 338 days.

(21) Appl. No.: 15/351,963

(22) Filed: Nov. 15, 2016

(65) Prior Publication Data

US 2018/0136312 A1 May 17, 2018

(51) Int. Cl.
| | |
|---|---|
| *G01S 13/93* | (2006.01) |
| *G01S 13/87* | (2006.01) |
| *H01Q 1/32* | (2006.01) |
| *H01Q 21/29* | (2006.01) |
| *G01S 7/03* | (2006.01) |

(52) U.S. Cl.
CPC .......... *G01S 13/931* (2013.01); *G01S 13/878* (2013.01); *H01Q 1/3233* (2013.01); *H01Q 21/29* (2013.01); *G01S 7/032* (2013.01)

(58) Field of Classification Search
CPC ...... G01S 13/878; G01S 13/931; G01S 7/032; H01Q 1/3233; H01Q 21/29
USPC ........................................................ 342/175
See application file for complete search history.

(56) References Cited

U.S. PATENT DOCUMENTS

| | | | | |
|---|---|---|---|---|
| 6,087,928 A | * | 7/2000 | Kleinberg | B60Q 9/008 340/435 |
| 6,215,438 B1 | | 4/2001 | Oswald et al. | |
| 6,400,308 B1 | * | 6/2002 | Bell | B60Q 1/0023 340/901 |
| 6,611,759 B2 | | 8/2003 | Brosche | |
| 6,970,142 B1 | * | 11/2005 | Pleva | G01S 7/032 343/700 MS |
| 6,995,730 B2 | | 2/2006 | Pleva et al. | |
| 9,075,145 B2 | * | 7/2015 | Reiter | G01S 7/12 |
| 9,229,099 B2 | | 1/2016 | Brown et al. | |
| 2006/0145921 A1 | * | 7/2006 | Ranta | H01Q 1/007 342/374 |
| 2008/0088499 A1 | | 4/2008 | Bonthron et al. | |
| 2012/0119932 A1 | * | 5/2012 | MacDonald | H01Q 1/425 342/1 |
| 2012/0194377 A1 | * | 8/2012 | Yukumatsu | G01S 13/931 342/70 |
| 2013/0285848 A1 | * | 10/2013 | Grau Besoli | G01S 7/03 342/134 |

(Continued)

FOREIGN PATENT DOCUMENTS

| | | |
|---|---|---|
| EP | 0 717 290 | 11/2001 |
| EP | 1 739 453 | 8/2013 |

*Primary Examiner* — Timothy A Brainard
(74) *Attorney, Agent, or Firm* — Burns & Levinson LLP; Steven M. Mills (57) ABSTRACT

A radar module for forming an ultra-wide field of view, including vertically oriented and laterally spaced first and second antennas for transmitting radar signals and for receiving the radar signals after the radar signals have been reflected from a reflecting surface of an object in the FOV of the module. At least one transceiver is configured to generate drive signals for the first and second antennas, such that each antenna forms a flat beam, and a signal processor is configured to detect from the received reflected radar signals a location of one or more objects in the FOV of the module.

18 Claims, 11 Drawing Sheets

(56) References Cited

U.S. PATENT DOCUMENTS

| | | | | |
|---|---|---|---|---|
| 2014/0085128 A1* | 3/2014 | Kishigami | ............ | G01S 13/288 342/118 |
| 2014/0104097 A1* | 4/2014 | Binzer | ................. | G01S 13/931 342/74 |
| 2014/0354470 A1* | 12/2014 | Kuo | ......................... | G01S 7/35 342/200 |

* cited by examiner

RADAR MODULE

BACKGROUND

The following disclosure relates to radar modules for providing ultra-wide angular field of view (FOV) coverage.

Radar technology has increasingly been used in numerous applications in consumer products. For example, radar systems have been incorporated into cars and other vehicles to provide parking assistance systems, collision avoidance systems, and air bag deployment systems (pre-crash detection). Depending upon the particular task being performed by the radar, vehicle-mounted radar systems may need to provide information regarding obstacles that may be within a range of distances (e.g., 1 to 100 meters), and any angular position around the vehicle.

Figure 1A:
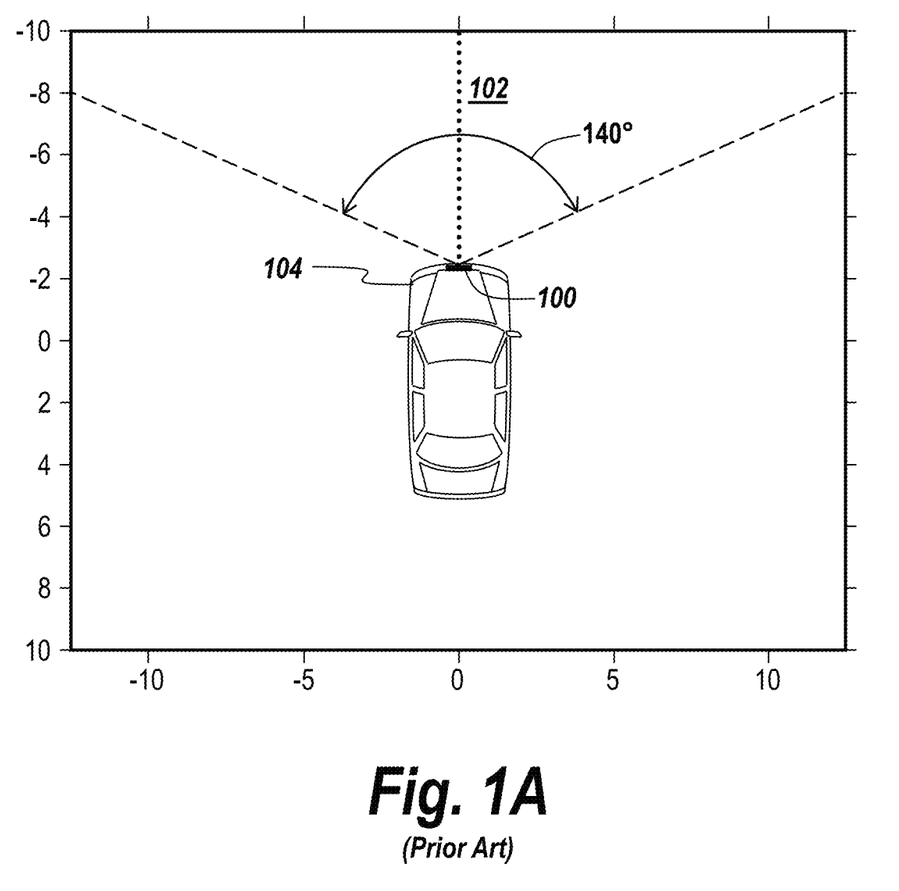
FIGS. 1A and 1B are simplified convention automotive radar beam plots.
Figure 1B:
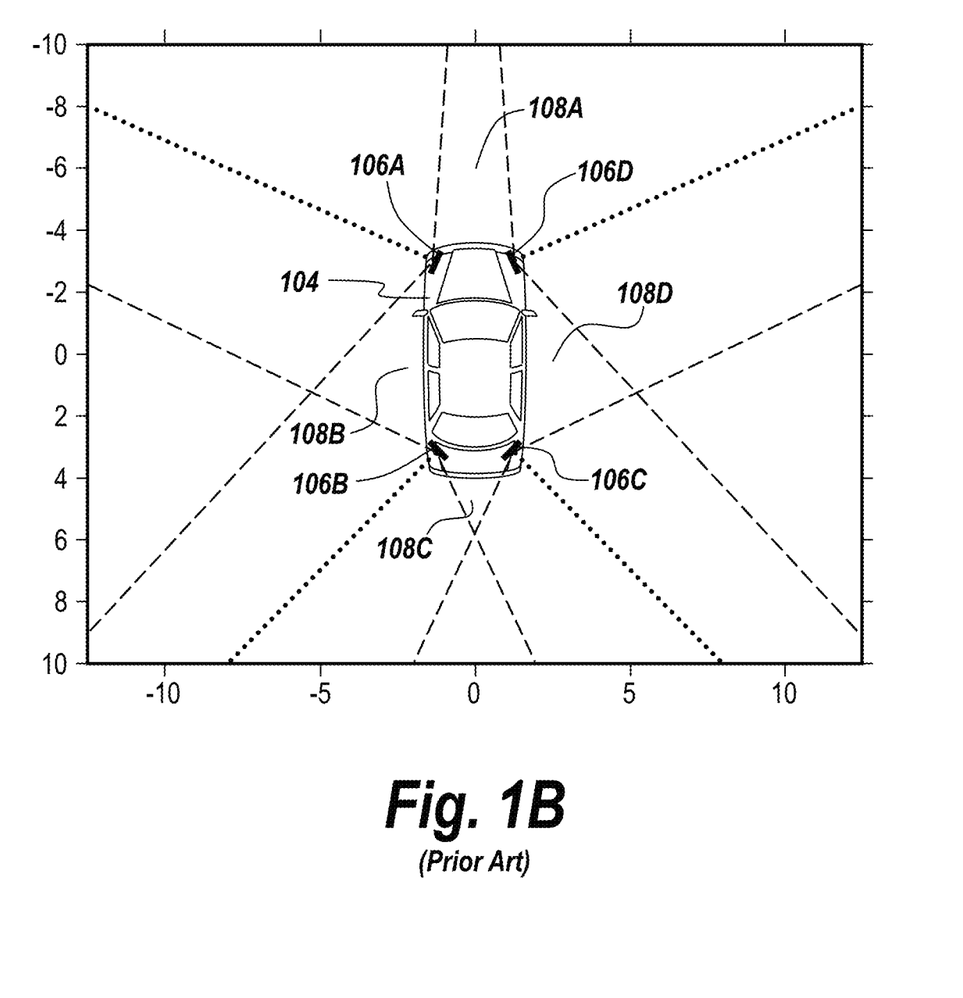

With regard to FIG. 1A, a conventional baseline radar module 100 may be configured with a single antenna. This configuration may provide an azimuthal FOV 102 of ±70°. This 140° module 100 facing northward from vehicle 104 in FIG. 1A can be seen providing limited coverage. FIG. 1B shows another typical arrangement, in which vehicle 104 uses four radar modules 106A-106D to cover the front, rear, left and right side quadrants of vehicle 104 in order to provide a nearly complete surround coverage. However, even the use of four modules may not achieve full azimuthal coverage (see uncovered regions 108A-108D.)

Certain vehicle blind spot detection/monitoring systems implement one broad radar transmit pattern and an array of receivers. The narrow receiver beams are either steered or formed digitally, and scan the area of interest. This approach has the disadvantage of requiring multiple analog receiver circuits, which can be of relatively high-cost. In other systems, a single broad transmit antenna is used for short range, and several, e.g., four, separate receivers are used to enable digital beam forming. These approaches to digital beam forming can also add substantially to the cost of the radar system.

Furthermore, some applications (e.g., automotive radar) have relatively difficult design parameters, including restrictions on the physical size of the radar system, in addition to minimum operational performance requirements. Competing design requirements (e.g. low cost, small size, high performance parameters) can make the design of such radar systems relatively challenging. Among the design challenges is the challenge to provide an antenna system which meets the design goals of being low cost, compact and high performance.

Thus, it would be desirable to provide a compact radar module that provides a cost effective approach to obtaining relatively high performance characteristics, including an ultra-wide azimuthal FOV.

SUMMARY

In accordance with various embodiments, an ultra-wide FOV radar module is provided, which overcomes the drawbacks of the prior art and meets the requirements of cost and size efficiency. One or more of the modules may be used in a wide variety of applications, including mounting on mobile machines such as any type of moving vehicle, including an automobile, bus, truck, motorcycle, bicycle, etc. The embodiments described herein most commonly refer to an automobile application. However, it will be understood that the embodiments are applicable to other types of vehicles or machines, and/or in any radar environment where cost and space considerations are paramount.

According to the first embodiment, a flat beam transmission (Tx) pattern with specific characteristics may be formed by a radar module. The Tx pattern may be fixed, i.e., not steerable, and may have a wide FOV covering a region adjacent the module (or, for example, adjacent a vehicle to which the module may be mounted.) The module includes at least a pair of vertically oriented and laterally spaced first and second antennas for transmitting Tx radar signals, and for receiving the radar signals after the radar signals have been reflected from a reflecting surface of an object in the FOV of the module. The module may also include transceiver circuitry configured to generate drive signals for the antennas, such that each antenna forms the flat beam. The module may also include a signal processor for detecting from the received reflected radar signals a location of one or more objects in the FOV.

In another embodiment, the transceiver circuitry may cause the antennas to receive signals during a sampling period. The sampling period may be delayed with respect to a portion of the transmitted Tx radar signal by a time delay corresponding to the time taken for that portion to travel to the reflecting surface of the object. Control circuitry integrated into the module may be shared by the first and second antennas, each of which may comprise an array of antenna elements (e.g., radio wave or microwave radiators, etc.) with a center signal feedpoint. The antennas may also share transmitter electronics and the signal processor. The ultra-wide, flat beam pattern is achieved by a suitable choice of phase relationships among the beam signals fed to the arrayed antenna elements.

In another embodiment, two of the radar modules may be fixedly mounted a diametrically opposed positions of a mobile machine, such as a motor vehicle. Together, the two radar modules provide full 360° FOV coverage for the automobile. The transceiver circuitry may cause one of the modules to transmit radar signals having up-chirp ramps, and the other to transmit with down-chirp ramps. In an extension of this embodiment, another pair of radar modules may be utilized, so that a module is mounted at each of four corners of the vehicle, thereby providing redundant coverage around the vehicle.

In one aspect, each of the components of the radar module may be fabricated as a single contiguous unit. The radar module may include a radiation absorbing material separating the antennas.

In another aspect, the transceiver circuitry alternates radar signal transmission from the first and second antennas.

In certain embodiments, the module may comprise an impulse radar system.

In yet another embodiment, the antennas are fixedly oriented relative to one another so as to provide a very wide angle (e.g., about 270°) FOV. The first and second antennas may be fabricated on or coupled, respectively, to distinct, substantially planar surfaces of a radome of the module canted with respect to one another so as to form the very wide angle FOV (e.g., at approximately 50° for a 270° FOV, etc.). Each flat beam may be formed by an array of antenna elements of each antenna, and may cover approximately a ±70° FOV of the bore sight of each antenna element array. When used herein, the term 'beam' refers to a certain spatial transmit radiation pattern or spatial receive sensitivity pattern created by using a combination of multiple antenna elements and the corresponding complex-valued weights applied to the signal at each antenna element. Further, in this description, the transmit radiated energy pattern and the spatial transmit radiation pattern may also be referred to as a transmission pattern, and the receive sensed energy pattern and the spatial receive sensitivity pattern may also be referred to as a reception pattern.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE FIGURES

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the disclosure. In the figures.

DETAILED DESCRIPTION

The foregoing summary and brief description of drawings, as well as the following detailed description of certain embodiments, will be better understood when read in conjunction with the appended drawings. It will be understood by those of ordinary skill in the art that these may be practiced without independently some of these specific details. In other instances, well-known methods, procedures, components and structures may not have been described in detail so as not to obscure the embodiments. For example, those of skill in the art will understand that there are many different well-known techniques for processing radar signals to determine the range of objects, to resolve different objects from each other, and to determine the relative velocity of objects. These technologies are not the focus of this disclosure, and thus will not be significantly discussed.

The following descriptions of preferred embodiments are merely exemplary in nature and in no way intended to limit the disclosure, its application, or uses. For example, while approximate angles of antenna orientations and/or beams formed may be described, those of skill in the art will appreciated that actual antenna module geometries may be varied to generate ultra-wide (e.g., 140° up to full 360°) beam patterns as desired and appropriate for each particular application. Also, it is to be understood that the phraseology and terminology employed herein are for the purpose of description only and should not be regarded as limiting.

It is appreciated that certain features, are, for clarity, described in the context of separate embodiments but may also be provided in combination in a single embodiment. Conversely, various features are, for brevity, described in the context of a single embodiment but may also be provided separately or in any suitable sub-combination.

Figure 2A:
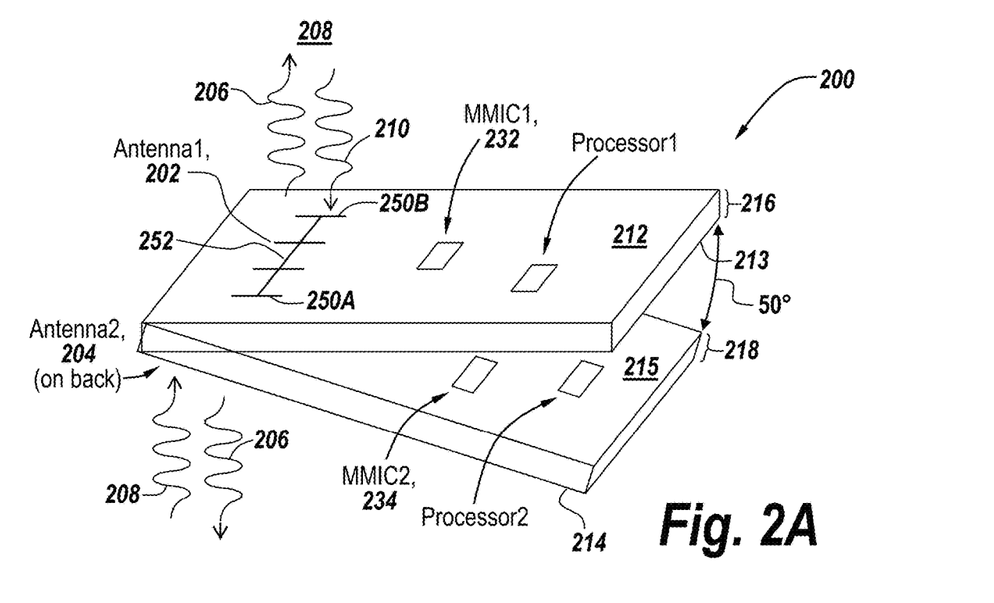
FIG. 2A is a schematic illustration of an exemplary embodiment of an ultra-wide radar module.
Figure 2B:
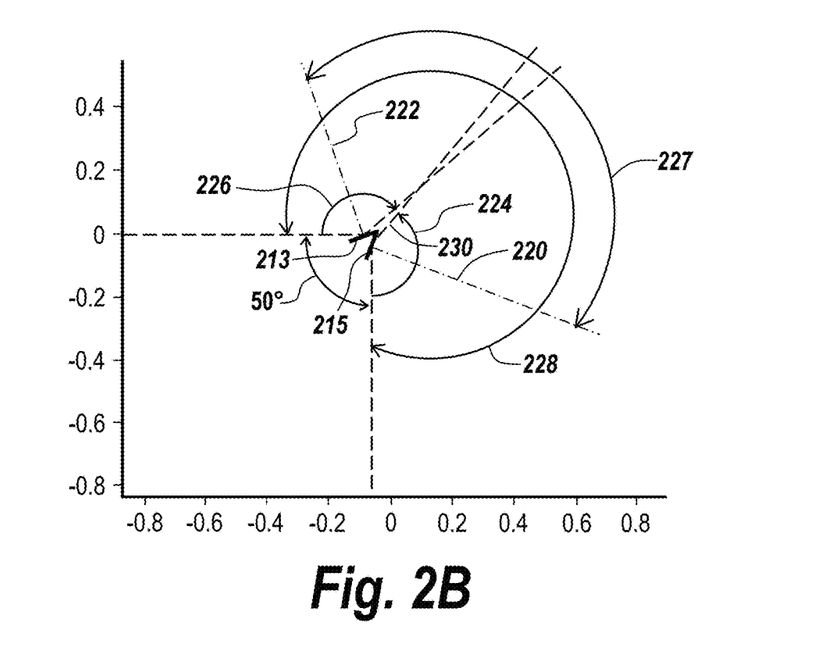
FIG. 2B is a corresponding beam pattern plot.

FIG. 2A is a top view perspective, and FIG. 2B a simplified beam pattern plot, of an exemplary single conformal or flexible radar module 200 and the radar beam coverage of the module 200. The radar module 200 includes vertically oriented and laterally spaced antennas 202,204 for transmitting radar signals 206 (i.e., radio waves or microwaves) into a region 208 being monitored, and for receiving the radar signals 210 after the radar signals 206 have been reflected from a reflecting surface of an object (e.g., another vehicle, obstacle, etc.) in the FOV 250 of the module 200. The antennas 202,204 of the example may be mounted respectively on two substantially flat transmission and reception surfaces 212,214 (which may comprise printed circuit boards) of two major cuboid sections 216,218 of module 200. Cuboid sections 216,218 may also have substantially flat back surfaces 213,215, that in one exemplary embodiment, may be configured to have an approximate 50° angular separation between them. Respective bore sights 220, 222 associated with antennas 202,204 may, in such an embodiment, be separated by an angle 227 of approximately 130°. Each of the antennas 202, 204 may form a flat beam 224, 226 covering approximately ±70° from its associated bore sight 220,222, resulting in a FOV 228 having a total angular spread for this embodiment of approximately 270° (there will be a 10° coverage overlap 230, which provides useful redundancy and extra radar beam energy at edges.) Variations from these angles are, of course, possible based on design requirements and the need for redundant beam coverage. The foregoing exemplary angles of the embodiment were selected because approximately three-quarter (270°) coverage may be useful for vehicle corner radar applications.

Generation and transmission of antenna feed signals is accomplished by one or more transceiver circuits 232,234 (e.g., MMIC1 and MMIC2), which may include a RF signal generator and other radar transmit circuitry required to generate the radar signals 206 transmitted via antennas 202,204, such as pulse shaping circuitry, transmit trigger circuitry, RF switch circuitry, or any other appropriate transmit circuitry used by radar module 200. The transceiver circuitry 232,234 may be controlled via one or more signal processors 236,238 issuing commands and control signals via control lines, such that the desired radar signal having the desired configuration and signal parameters is transmitted from antennas 202,204. Such electronic components may be configured in the cuboid sections 216,218. Transceiver circuitry 232,234 and signal processors 236,238 also detect from the received reflected radar signals 210 a location (and possibly other features or parameters) of objects in the FOV 228 of module 200. In an exemplary embodiment, the antennas 202,204 may share a single transceiver circuit 232 and/or signal processor 236. This advantageously provides packaging, processor and other circuitry costs. The module 200 may be connected electrically to the vehicle driving management systems via conventional connector elements. Transceiver circuitry 232,234 and signal processors 236,238 may include any radar receive and analog processing circuitry required to process the received radar signals 210, such as signal splitting, mixing, heterodyne and/or homodyne conversion, amplification, filtering, receive signal triggering, signal switching and routing, and/or any other appropriate radar signal receive functions carried out by radar module 200. Signal processors 236,238 may comprise any of various types of processors capable of carrying out the processing on the received radar signals 210 and of controlling transceiver circuitry signal generation functionality. As such, processors 236,238 may comprise digital signal processors (DSP), microprocessors, microcontrollers, or other such devices. In order to carry out the radar operation and functionality of radar module 200, signal processors 236,238 may interface via a system bus with one or more other required circuits, such as one or more memory devices, peripheral circuitry, and any required input/output circuitry.

Figure 3A:
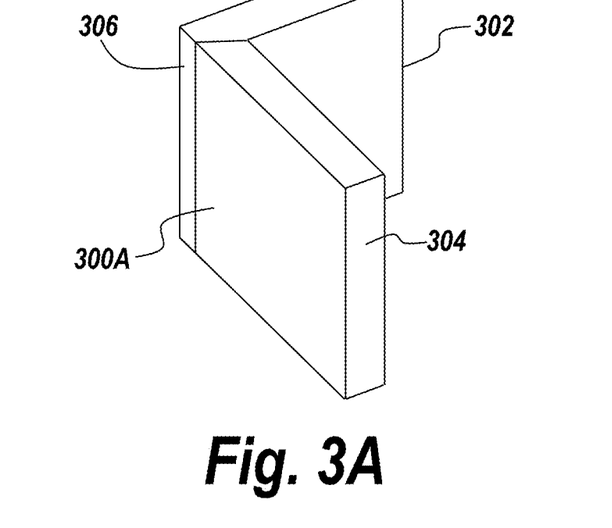
FIGS. 3A and 3B are illustrations of example antenna module radomes.
Figure 3B:
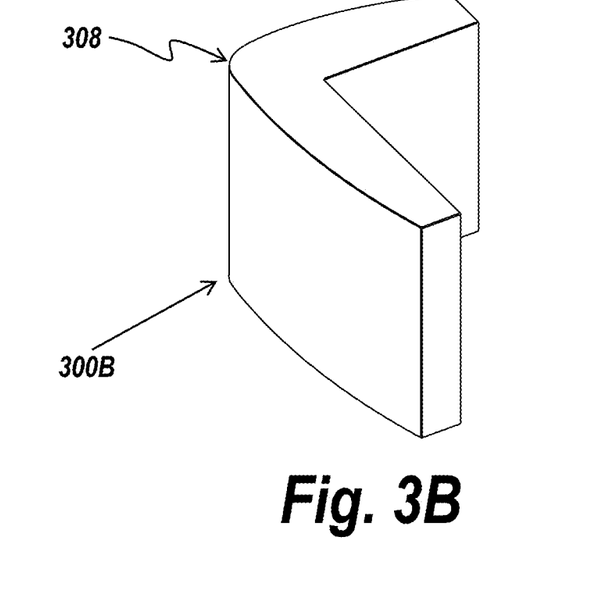

FIGS. 3A and 3B show two alternative embodiments of integrated radomes 300A, 300B for radar module 200. FIG. 3A illustrates a sharp-edged radome 300A, in which two 140° antenna cuboid sections 302,304 (similar to those described above) may be butted together at an angle. Two individual radomes covering each radar unit could also be utilized. An internal radiation absorbing structure 306 disposed between antenna cuboid sections 302,304 may also be utilized for avoiding interference between the radar units. FIG. 3B illustrates an alternative design, wherein radome 300B is fabricated as a single contiguous, curved or angled unit, which may provide less reflected energy at center position 308. The package encase the radars may be designed in nearly an L-shape to accommodate the radar units.

Figure 4:
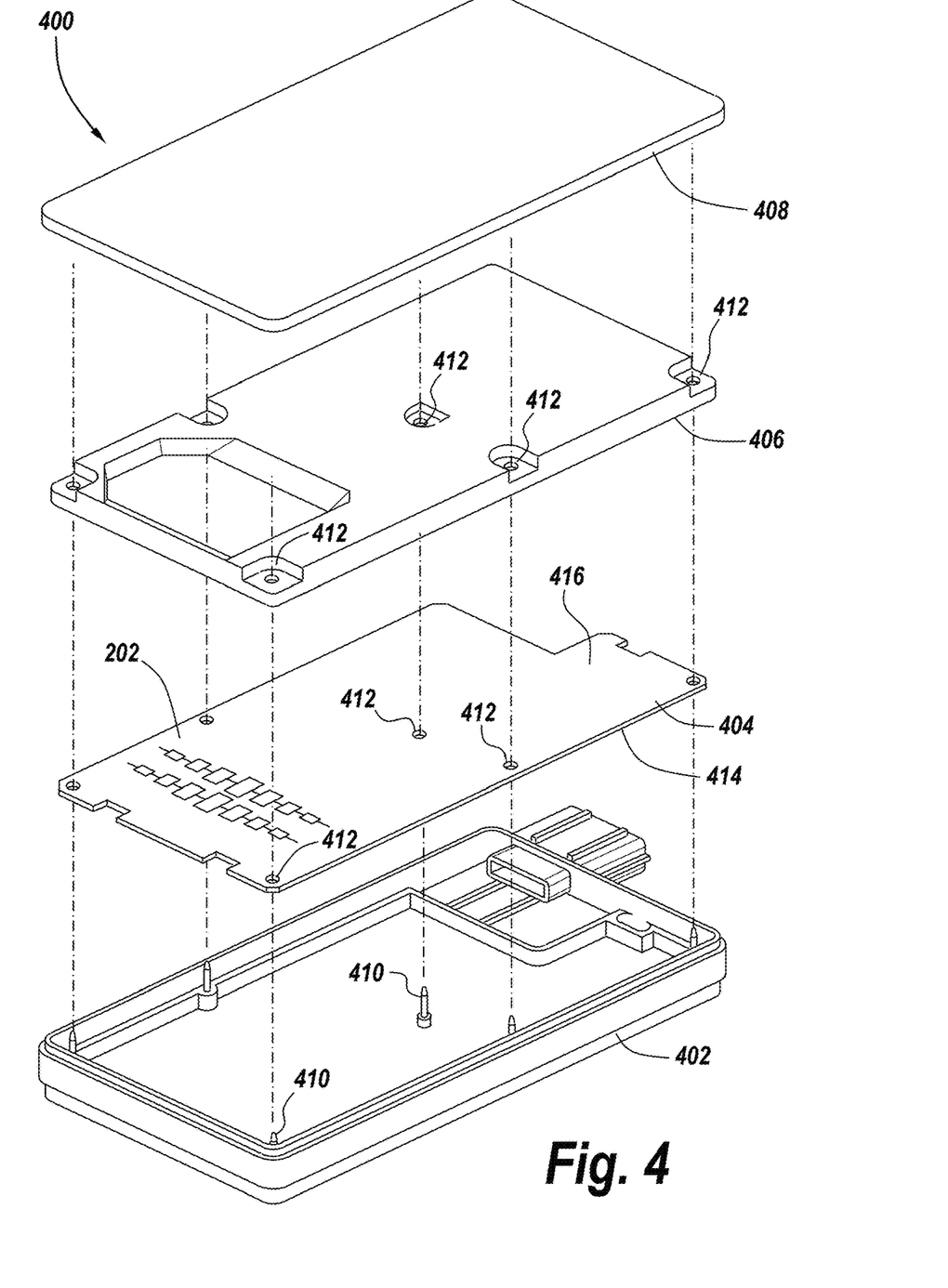
FIG. 4 is an exploded diagram of a portion of an exemplary radar antenna module.

With reference to FIG. 4, a module section 400 (similar to cuboid section 216) may include a housing 402 or base in which the aforementioned electrical components of module section 400 are mounted. Module section 400 may also include a PCB 404, an EMI shield 406 and a radome portion 408 disposed in a stacked configuration and assembled together. Housing 402 can be made of plastic and can be formed by injection molding. The use of plastic material for housing 402 facilitates laser welding of module radome portion 408 to housing 402 to ensure a hermetic seal. For the purpose of EMI shielding, the inner surface of housing 402 may be conductive. To that end, the plastic material of housing 402 can be conductive plastic material. Posts 410 and holes 412 may be used to hold housing 402, PCB 404 and EMI shield 406 together.

PCB 404 may have a side 414 on which are mounted components, circuits and devices related to the digital electronic operation of module section 400. For example, devices such as one or more digital signal processors (DSPs), semiconductor memories, input/output interface devices, and/or other digital electronic devices and discrete components, can be mounted on the second or bottom side 414 of PCB 404. According to some exemplary embodiments, bottom side 414 of PCB 404 also includes conductive traces connecting the electronic circuitry. Antenna 202, which may comprise an antenna patch pattern, formed on top surface 416 of PCB 404, are also EMI shielded according to exemplary embodiments. The components of the various embodiments of the radar of the present disclosure may be constructed of different materials such as, for example, semiconductor material. Additionally, the transmitting antenna(s) and receiving antenna(s) and components thereof may be formed of standard antenna arrays as are known.

Figure 5:
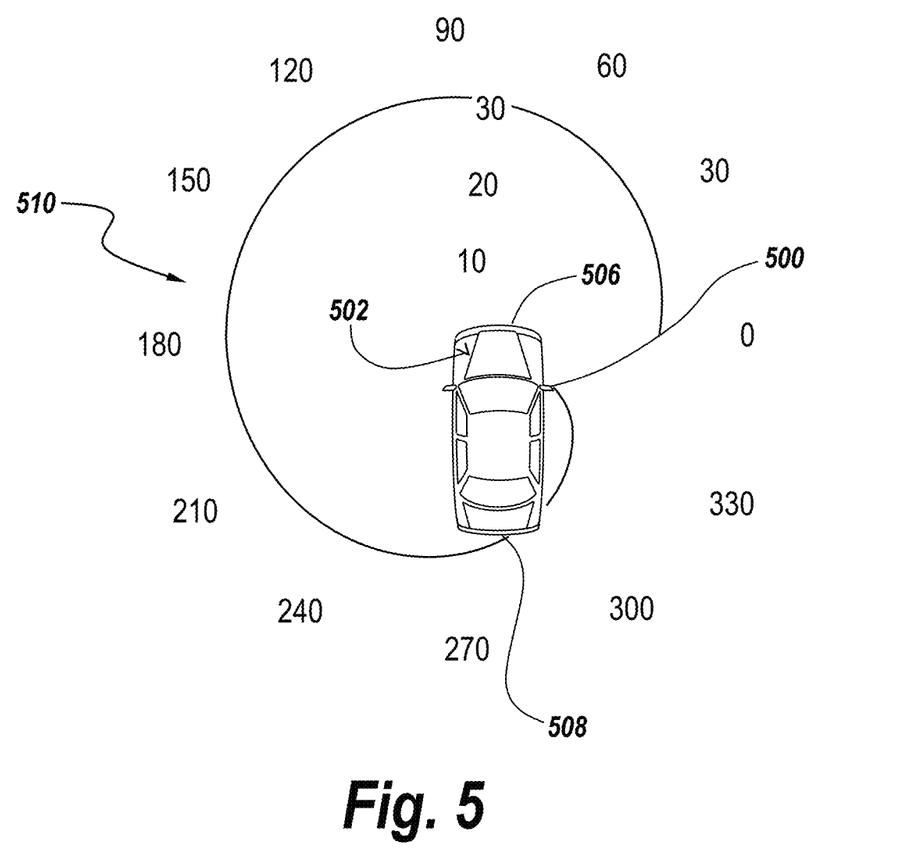
FIG. 5 is a plot of an exemplary beam pattern formed by a module in accordance with an embodiment of this disclosure.
Figure 6:
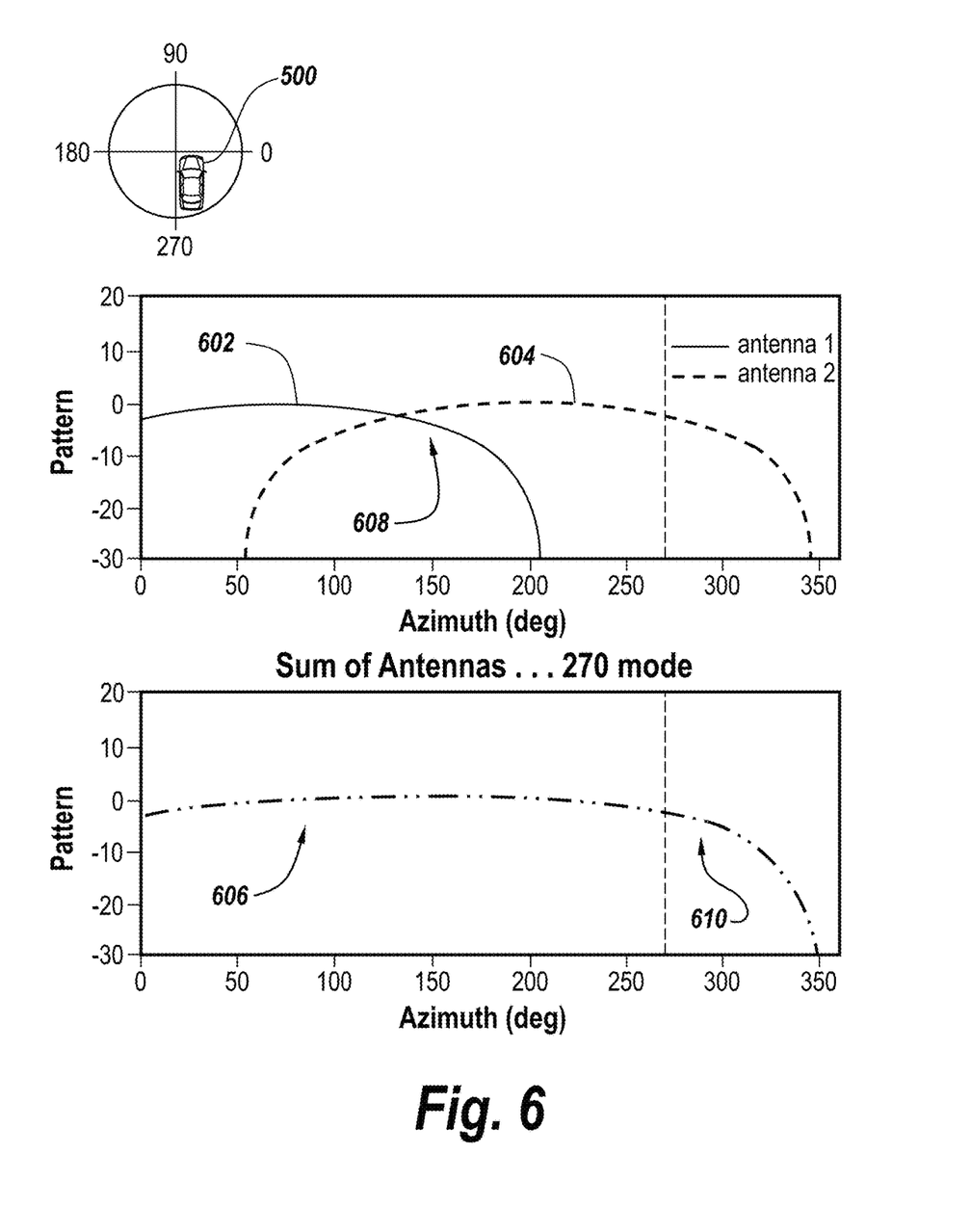
FIG. 6 are plots of individual and combined beam patterns for antennas of an exemplary embodiment of the radar module.

FIG. 5 provides an exemplary polar plot of a transmit beam pattern 510 around a significant portion of a vehicle 500 having a radar module 502 installed thereon at a front, left corner 504, using a bracket (not shown.) The radar bracket may be integrally molded with housing 402, but exposing the antenna transmission and reception surfaces of module 500. Bracket supporting and securing parts such as known in the art may be used to mount the module 502 to the vehicle 500. The module 502 may be disposed, for example, near the end portion of the front bumper frame 506 in the front part of the vehicle, or near the end portion of the rear bumper frame 508 in the rear part of the vehicle. The transmit beam pattern 510 represents a flat beam pattern with single main lobe with high gain for object detection, in this example, over an approximately 270° FOV. FIG. 6 shows the exemplary individual beam patterns 602,604 produced by the radar module 502 configured with two (e.g., 140°) antennas as described above, and their summed beam pattern 606 which is flat over a 0° to 270° region of interest around vehicle 500, with a sensor overlap in the 130°-140° region 608. The 270°-360° region 610 is obscured by vehicle 500, but may not be important for the particular application.

Figure 7A:
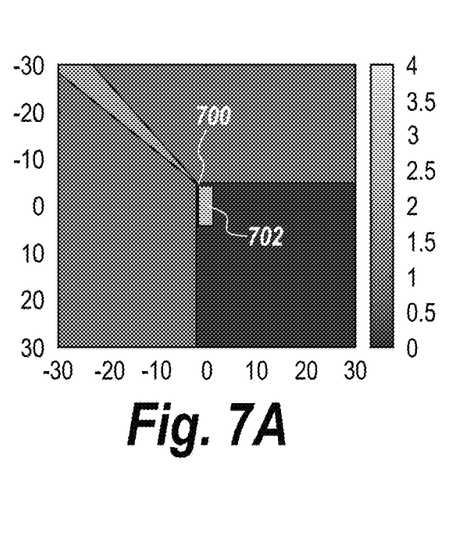
FIGS. 7A-7C are simplified plots of beam coverage for alternative mounting combinations of antenna modules on an automotive vehicle.
Figure 7B:
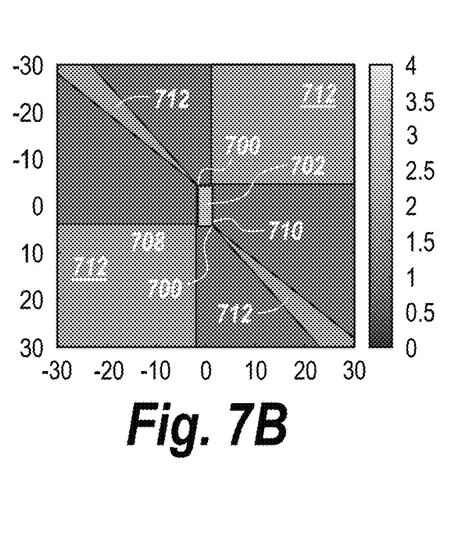
Figure 7C:
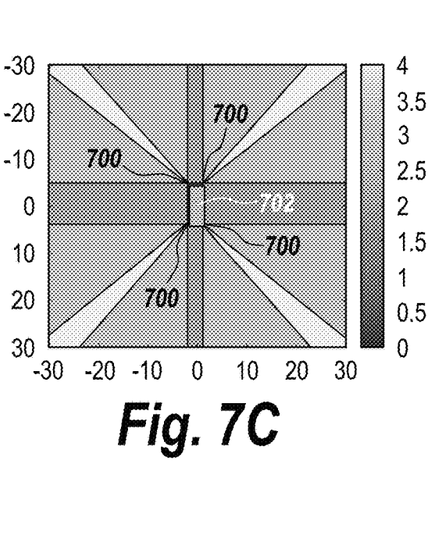

FIGS. 7A-7C are simplified plots of beam pattern coverage provided by mounting one or more modules 700 in different numbers and positions on an automotive vehicle 702. FIG. 7A shows the single-corner mounting case described above, in which the ultra-wide radar module 700 provides coverage on two sides 704,706 of vehicle 702. FIG. 7B shows how two modules 700, fixedly mounted at diametrically opposed positions 708,710 on vehicle 702, can provide full azimuthal 360° coverage, and provide several overlap regions 712. Use of only two radar modules, rather than four, would represent a significant cost savings to, for example, a vehicle manufacturer. Using four radar modules 700, one at each corner of vehicle 702, provides significant coverage redundancy, with at least two radar beams overlapping at all points around vehicle 702 i.e., many regions are covered by three radar beams.) Alternatively, mounting module 700 at a front, center position (not shown) of vehicle 702 may provide full ±90° coverage of the front of the vehicle.

With reference again to the exemplary embodiment of FIGS. 2A and 2B, each antenna 202,204 may comprise an array of spatially separated microwave antenna elements $250_a$-$250_n$, which may be spatially separated in an axis of the targeted region adjacent the module 200. The antenna elements $250_a$-$250_n$ are coupled to a center signal feed point 252. Antenna elements $250_a$-$250_n$ comprise an antenna network for transmitting radar signals and for receiving reflected portions of said transmitted radar signal. Antenna elements $250_a$-$250_n$ may each produce one or a plurality of transmit beam shapes and one or a plurality of receive beam shapes that are utilized in combination to generate the common flat radar beam 228 for object detection. Transceiver circuitry 232,234 may be used to generate the radar transmit pattern, using appropriate antenna feed signal phase shifting and amplitude modulation (if necessary.) The number and types of beam shapes may, of course, vary. The total area covered by the combined detection regions for each antenna element $250_a$-$250_n$ comprises the coverage area for an antenna 202,204. As noted, the wide angular coverage enables the reduction of the number of radar modules required to cover multiple vehicle sides. Coverage requirements may include redundancy, wherein objects in proximity to the vehicle may need to be detected (concurrently or sequentially) in overlapping detection zones/FOV of a plurality of modules 200. In addition, an antenna/signal processing unit combination may be required to detect range and/or velocity of the object.

A wide beam may be generated according to this embodiment by the even distribution of the amplitude, and with suitable phase relationship, of a wide beam signal to the antenna elements $250_a$-$250_n$. This wide beam signal may be power amplified by means of a set of amplifying modules not shown in the figures. In this way, the wide beam signal will mainly be transmitted by one of said antenna elements in the antenna array. The beam width of the wide beam obtained in this way will then mainly be determined by the individual radiation pattern of this antenna element. Alternative embodiments may utilize different phase relationships to concentrate power to an antenna port of one of the antenna elements.

Figure 8A:
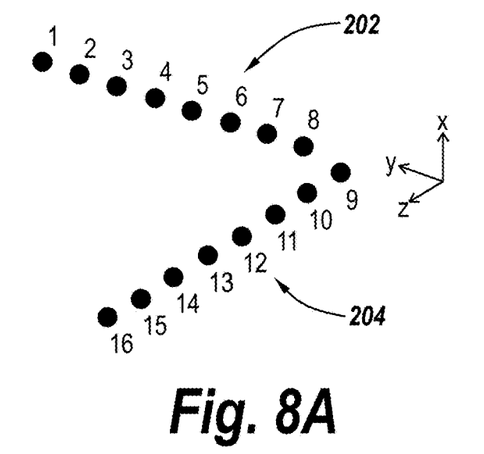
FIG. 8A is a simplified illustration of two linear arrays of antenna elements.
Figure 8B:
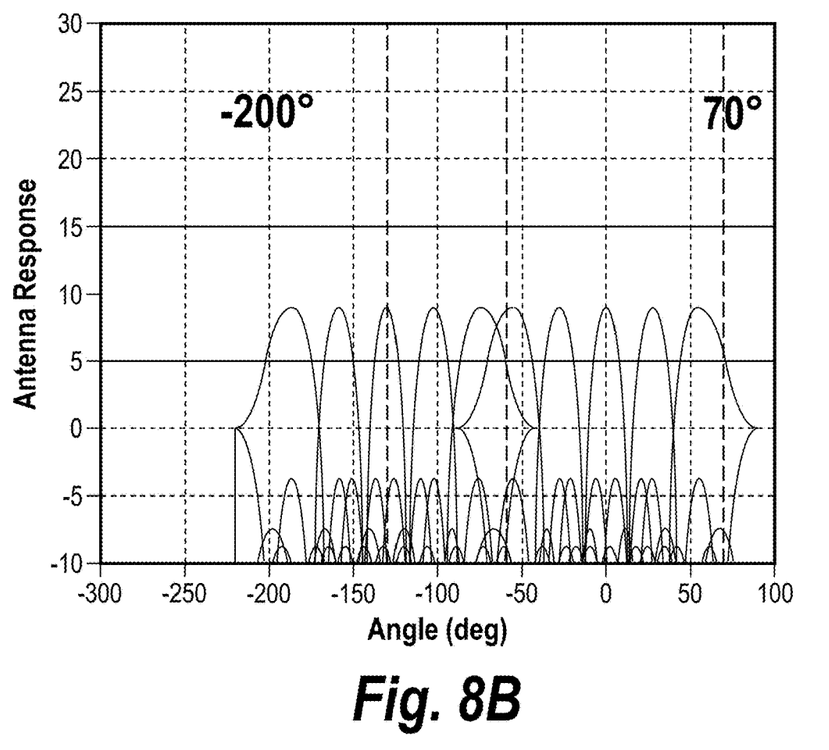
FIG. 8B is a plot of exemplary beams capable of being formed by said arrays, in accordance with an embodiment of this disclosure.

In the embodiment shown in FIG. 8A, antennas 202,204 may each comprise linear arrays of eight (8) equispaced antenna elements. Beamforming through application of complex-valued weights (for transmission or reception) may produce any antenna array spatial pattern, however using the exemplary antenna weights shown in Table One below, each antenna 202, 204 may form five (5) directional beams as illustrated in FIG. 8B. The complex weight factors accomplish both phase shifting and amplitude weighting of the antenna data prior to summation. In this embodiment, antenna elements 1-8 may cover a FOV from about 70° to about −70°, while antenna elements 9-16 may cover from about −60° to about −200°.

| Antenna Number | Complex Weight | Complex Weight |
| --- | --- | --- |
|  | for angle = 0° | for angle = −55° |
| 1 | 0 | −0.92 + 0.4i |
| 2 | 0 | 0.99 + .15i |
| 3 | 0 | −0.75 − 0.66i |
| 4 | 0 | 0.28 + 0.96i |
| 5 | 0 | 0.28 − 0.96i |
| 6 | 0 | −0.75 + 0.66i |
| 7 | 0 | 0.99 − 0.15i |
| 8 | 0 | −0.92 − 0.40i |
|  | for angle = −130° | for angle = −185° |
| 9 | 0 | −0.92 + 0.4i |
| 10 | 0 | 0.99 + .15i |
| 11 | 0 | −0.75 − 0.66i |
| 12 | 0 | 0.28 + 0.96i |
| 13 | 0 | 0.28 − 0.96i |
| 14 | 0 | −0.75 + 0.66i |
| 15 | 0 | 0.99 − 0.15i |
| 16 | 0 | −0.92 − 0.40i |

Figure 11:
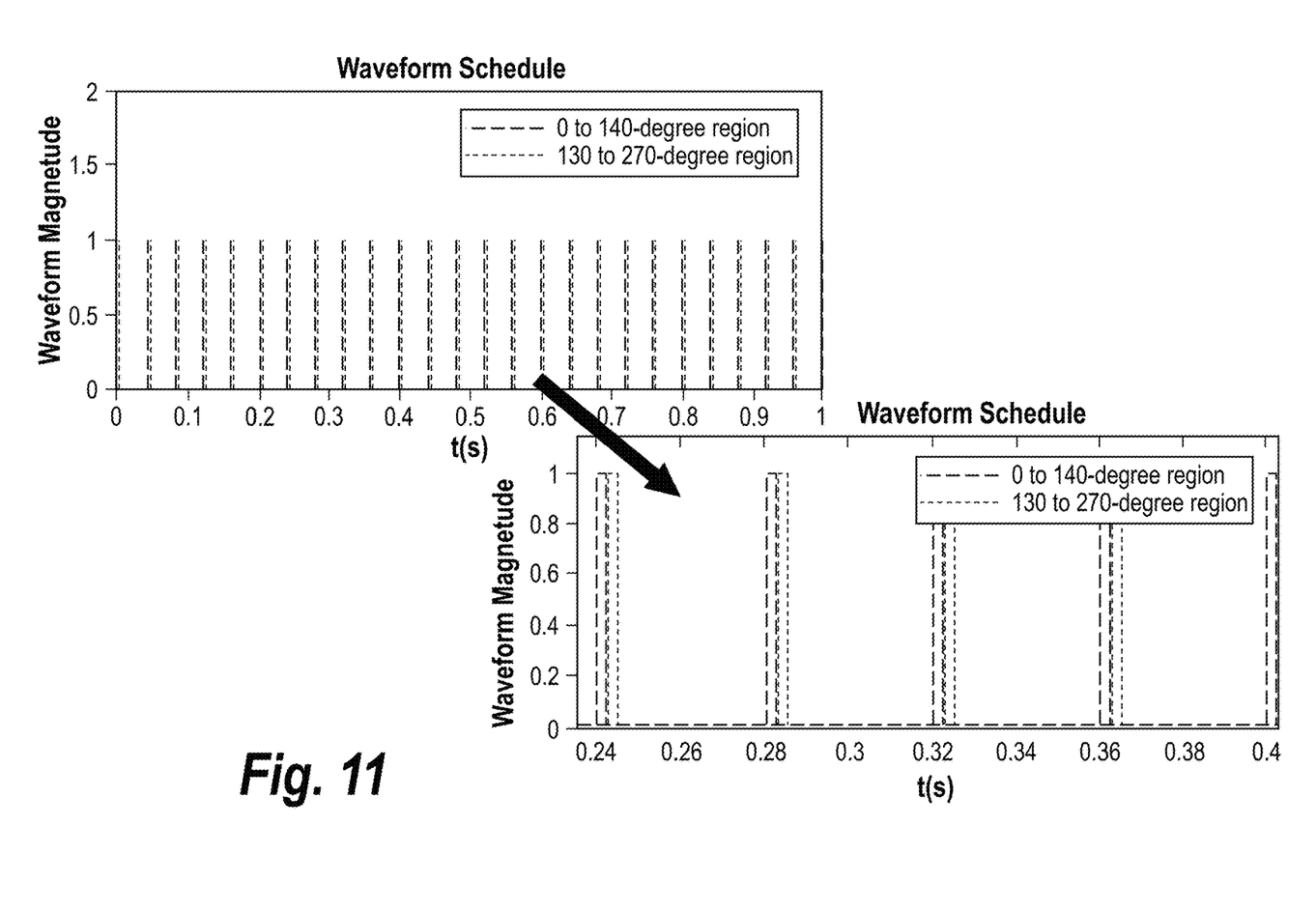
FIG. 11 is a sample waveform schedule for radiation interference mitigation.

In one embodiment, interference between the two antennas 202,204 is avoided by never transmitting from both antennas simultaneously. The radar transceiver circuitry 232,234 may stagger the transmit schedule so that the antennas 202,204 transmit sequentially rather than simultaneously, and receive reflected signals 210 for each antenna during distinct sampling periods, which may be defined so as to account for expected time for the radar waves to be returned to the antenna after reflection from a surface of an object in the module's FOV. FIG. 11 shows an exemplary transmit schedule for driving the antennas 202,204.

Figure 9:
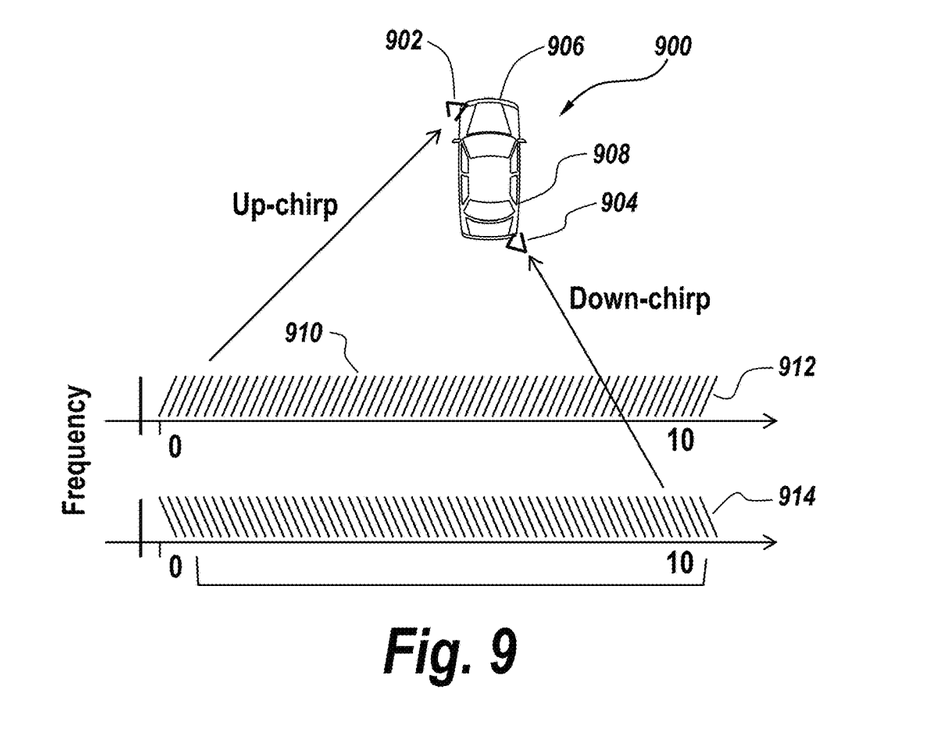
FIG. 9 is an illustration of an example of radar signal transmission with up and down chirping for interference mitigation.

In another embodiment, interference may alternatively, or additionally, be mitigated using chirping techniques, such as described in U.S. Pat. No. 7,791,528 to Klotzbuecher et al., entitled "Method and Apparatus for Radar Signal Processing", issued Sep. 7, 2010, the contents of which are incorporated by reference in their entirety. FIG. 9 illustrates modules 902, 904 mounted at opposing corners 906,908 of a vehicle 900. Module 902 transmits radar signals 910 having up-chirp ramps 912, while module 904 transmits with down-chirp ramps 914. This permits discrimination of the reflected signals.

Figure 10:
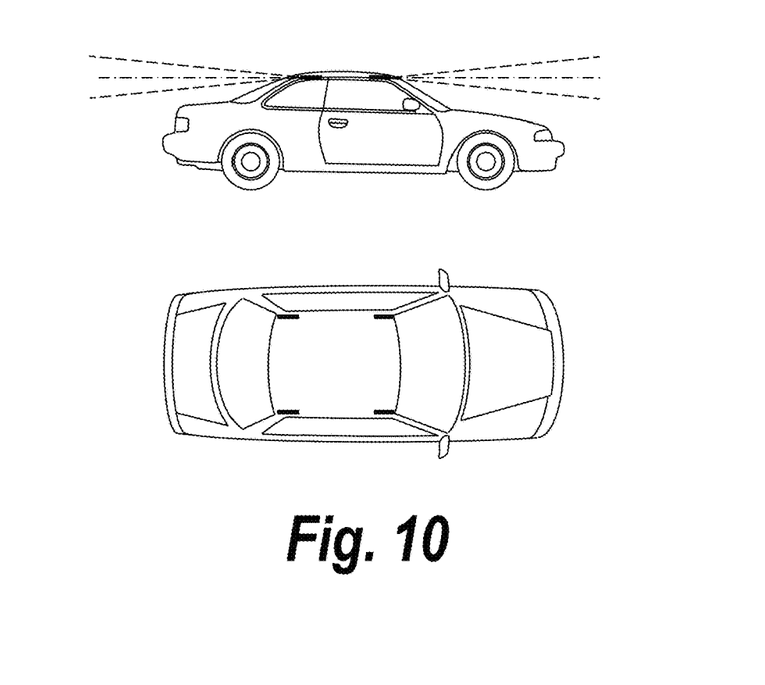
FIG. 10 are illustrations of an alternative mounting of exemplary radar modules on an automotive vehicle.

Various alternative embodiments will be readily appreciated by those of skill in the art. For example, FIG. 10 illustrates an alternative mounting location for radar modules on or near the roof of a vehicle. The particular design of the radar modules are similar to those used described above. Although not shown, other geometries are, of course, possible such as having the radar modules mounted above the headlights for the frontal modules, or vice versa.

This disclosure contemplates the use of any combination of antennas available for use in radar systems, such as yagi, dipole and monopole designs, and steerable designs such as phased array. The disclosure also envisions the use of continuous wave or pulsed radar systems. Hardware intensive pulsed (microwave, millimeter wave and RF band) radar systems were historically preferred for automotive applications, but have been displaced with frequency modulated continuous wave radar system, owing to the costs of hardware remaining relatively constant, compared to the fall in prices of signal processing.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As various modifications could be made to the exemplary embodiments, as described above with reference to the corresponding illustrations, without departing from the scope of the disclosure, it is intended that all matter contained in the foregoing description and shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A radar system for forming an ultrawide field of view (FOV) for a mobile machine, the radar system comprising:
    a radar module comprising a first surface and a second surface angularly separated from the first surface, the first surface comprising a vertically oriented first antenna and the second surface comprising a vertically oriented second antenna, the first and second antennas for transmitting radar signals and for receiving the radar signals after the radar signals have been reflected from a reflecting surface of an object in the FOV;

a second radar module comprising a third surface and a fourth surface angularly separated from the third surface, the third surface comprising a vertically oriented third antenna and the fourth surface comprising a vertically oriented fourth antenna, the third and fourth antennas for transmitting radar signals and for receiving the radar signals after the radar signals have been reflected from a reflecting surface of an object in the FOV;

at least one transceiver configured to generate drive signals for the first and second antennas, such that each antenna forms a flat beam; and a signal processor configured to detect from the received reflected radar signals a location of one or more objects in the FOV, wherein the radar module and the second radar module are fixedly mounted at diametrically opposed positions of the mobile machine, so as to provide approximately full 360° coverage around the mobile machine.

2. The radar system of claim 1, wherein the at least one transceiver causes the first and second antennas to receive signals during a sampling period.

3. The radar system of claim 2, wherein the sampling period is delayed with respect to a respective portion of the transmitted radar signal by a time delay corresponding to the time taken for that portion to travel to the reflecting surface of the object.

4. The radar system of claim 1, further comprising control circuitry shared by the first and second antennas.

5. The radar system of claim 1, wherein the first and second antenna share transmitter electronics.

6. The radar system of claim 1, wherein the signal processor is shared by the first and second antennas.

7. The radar system of claim 1,
further comprising a third radar module and a fourth radar module; and
wherein the mobile machine comprises a vehicle, and
the radar modules are fixedly disposed at each of four corners of the vehicle to provide redundant coverage around the vehicle.

8. The radar system of claim 1, fabricated as a single contiguous unit.

9. The radar system of claim 1, further comprising a radiation absorber separating the first and second antennas.

10. The radar system of claim 1, wherein the at least one transceiver alternates radar signal transmission from the first and second antennas.

11. The radar system of claim 1, wherein the at least one transceiver causes the radar module to transmit radar signals having up-chirp ramps and the second radar module to transmit with down-chirp ramps.

12. The radar system of claim 1, comprising an impulse radar system.

13. The radar system of claim 1, wherein the first and second antennas are oriented relative to one another so as to provide approximately a 270° FOV.

14. The radar system of claim 13, wherein the first and second antennas are disposed on or in respective substantially planar exterior surfaces canted at approximately 50° with respect to one another.

15. The radar system of claim 14, wherein the flat beam covers approximately ±70° from normal with respect to its associated substantially planar exterior surface.

16. The radar system of claim 1, wherein the each of the first and second antennas comprises an array of microwave antenna elements and a center signal feed point.

17. The radar system claim 1, wherein the first surface and the second surface are angularly separated by approximately 50°.

18. The radar system claim 1, wherein a first bore sight associated with the first antenna and a second boresight associated with the second antenna are separated by an angle of approximately 130°.

* * * * *